(12) United States Patent
Wang et al.

(10) Patent No.: US 10,527,777 B2
(45) Date of Patent: Jan. 7, 2020

(54) MODULAR LIGHT GUIDE PLATE

(71) Applicant: Xiamen Guangpu Electronics Co., LTD., Xiamen (CN)

(72) Inventors: Wenlong Wang, Xiamen (CN); Qingqing Chen, Xiamen (CN)

( * ) Notice: Subject to any disclaimer, the term of this patent is extended or adjusted under 35 U.S.C. 154(b) by 0 days.

(21) Appl. No.: 16/008,458

(22) Filed: Jun. 14, 2018

(65) Prior Publication Data

US 2019/0346616 A1    Nov. 14, 2019

(30) Foreign Application Priority Data

May 11, 2018 (CN) .......................... 2018 1 0450836

(51) Int. Cl.
*F21V 21/00* (2006.01)
*F21V 8/00* (2006.01)

(52) U.S. Cl.
CPC ......... *G02B 6/0055* (2013.01); *G02B 6/0051* (2013.01); *G02B 6/0065* (2013.01)

(58) Field of Classification Search
CPC .. G02B 6/0055; G02B 6/0051; G02B 6/0065; G02B 6/0043
USPC ......................... 362/625, 623, 624
See application file for complete search history.

(56) References Cited

U.S. PATENT DOCUMENTS

| | | | | |
|---|---|---|---|---|
| 2011/0176330 A1* | 7/2011 | Wu | ....... | G02B 6/0021 362/612 |
| 2013/0329452 A1* | 12/2013 | Mi | ....... | G02B 6/0038 362/606 |
| 2014/0071382 A1* | 3/2014 | Scardato | ....... | G02F 1/133606 349/65 |
| 2016/0097894 A1* | 4/2016 | Kim | ....... | G02B 6/0065 362/611 |
| 2017/0276861 A1* | 9/2017 | Watanabe | ....... | G02B 6/0033 |
| 2018/0106947 A1* | 4/2018 | Wong | ....... | G02B 6/0043 |
| 2018/0246267 A1* | 8/2018 | Lee | ....... | G02B 6/0035 |
| 2018/0292594 A1* | 10/2018 | Lee | ....... | G02B 6/0003 |

* cited by examiner

*Primary Examiner* — Laura K Tso
(74) *Attorney, Agent, or Firm* — W&K IP

(57) ABSTRACT

The present invention relates to a modular light guide plate comprising a light guide plate including a side wall used for entering the light to couple the light emitted by the LED into the interior of the light guide plate, an upper surface and a lower surface, and a reflective sheet arranged below the lower surface of the light guide plate and having a high reflectivity to the light emitted by the LED, wherein the lower surface of the light guide plate is provided with a raised dot, which is bonded to the lower surface of the light guide plate at the upper end thereof and to the upper surface of the reflective sheet at the lower end thereof, and the material of the dot body is a transparent optical material, and optical particles are uniformly dispersed in the dot, thereby having the advantages of high light extraction efficiency.

15 Claims, 3 Drawing Sheets

MODULAR LIGHT GUIDE PLATE

CROSS-REFERENCE TO RELATED APPLICATIONS

This application claims priority to Chinese Patent Application No. 201810450836.X with a filing date of May 11, 2018. The content of the aforementioned applications, including any intervening amendments thereto, are incorporated herein by reference.

TECHNICAL FIELD

The present disclosure belongs to the field of semiconductor lighting, in particular, relates to a modular light guide plate.

BACKGROUND OF THE PRESENT INVENTION

LED (Light-emitting diode) panel light is an innovative product in the field of semiconductor lighting. It can replace the traditional grille light, and has significant advantages such as energy saving, environmental protection, no glare, long life, and beautiful appearance. The main working principle of the LED panel light is similar to that of the LED backlight source of the LCD (Liquid-crystal display) TV. The LED is installed on the side of the light guide plate. The light is incident from the side wall of the light guide plate, and then propagates forward in the light guide plate by means of total reflection principle. When the total reflection is destroyed due to the light encountering the micro-structure of the surface of the light guide plate during the forward propagation process, part of the light will change the direction of propagation and exit from the upper and lower surfaces of the light guide plate. In order to utilize the light more effectively, a reflective plate is required to be disposed on the lower surface of the light guide plate for reflecting the light emitted from the lower surface back to the upper surface of the light guide plate. Therefore, the reflective sheet and the light guide plate are the core components of the LED panel light. The main technical development trends of LED panel lights are thinning and simple assembly. How to integrate the functions of the reflective sheet and the light guide plate to form an integrated module is an important issue in the field of LED panel lights.

The Chinese patent application CN201510923952.5 discloses a light source module comprising a light guide plate, at least one light emitting element, a reflective sheet and a plurality of gap units. The light guide plate has a first surface, a second surface opposing to the first surface, a light incident surface connecting the first surface and the second surface, and a plurality of optical micro-structures. The light emitting element is located adjacent to the light incident surface. The reflective sheet is attached to the second surface by an adhesive colloid. The gap unit is configured between the light guide plate and the reflective sheet, and the size of these gap units is greater than or equal to 1 micron. The adhesive colloid includes a first adhesive colloid and a second adhesive colloid. The first adhesive colloid is located between these gap units and the light guide plate, and the second adhesive colloid is located between these gap units and the reflective sheet, the gap unit being transparent. The disadvantage is that the first adhesive colloid and the second adhesive colloid form an optical waveguide layer, resulting in two losses of light: (1) the light originally supposed to propagate in the light guide plate is introduced into the first adhesive colloid layer and is introduced into the second adhesive colloid layer through the transparent gap unit, and the light then propagates forward in the form of total reflection within the first adhesive colloid layer or the second adhesive colloid layer and cannot exit from the front of the light guide plate; (2) the light emitted from the lower surface of the light guide plate obliquely enters into the first adhesive colloid layer or the second adhesive colloid layer, and then propagates forward therein in the form of total reflection and cannot exit from the front of the light guide plate. In addition, the leakage and loss of the light at the position corresponding to the gap unit to the lower surface causes a shadow to be formed at the position viewed from the front of the light guide plate, and the overall optical quality of the panel lamp is deteriorated. U.S. Pat. No. 8,827,526B discloses a method for bonding a reflective sheet or an optical element with a transparent adhesive layer on a side wall of a light guide plate so that a low refractive index transparent layer or an air layer is provided between the reflective sheet and the light outgoing side wall of the light guide plate to ensure the effects of total reflection of light on the side wall. The same disadvantage is that the transparent adhesive layer will form an optical waveguide effect, and the light that should have been transmitted in the light guide plate is transmitted to the transparent adhesive layer, and propagates forward in the form of total reflection within it, and cannot be emitted from the front of the light guide plate, resulting in the loss of light efficiency. In view of this, it is necessary to provide a modular light guide plate scheme with high light extraction efficiency and simple production to realize functional integration of the reflective sheet and the light guide plate.

SUMMARY OF PRESENT INVENTION

The present invention improves the problems existing in the prior art described above, that is, the technical problem to be solved by the present invention is to provide a modular light guide plate.

To solve above technical problem, the technical solution of the present invention is: a modular light guide plate comprising a light guide plate including a side wall used for entering the light to couple the light emitted by the LED into the interior of the light guide plate, an upper surface and a lower surface, and a reflective sheet arranged below the lower surface of the light guide plate and having a high reflectivity to the light emitted by the LED, wherein the lower surface of the light guide plate is provided with a raised dot, which is bonded to the lower surface of the light guide plate at the upper end thereof and to the upper surface of the reflective sheet at the lower end thereof, and the material of the dot body is a transparent optical material, and optical particles are uniformly dispersed in the dot.

The function of the modular light guide plate is to transmit the light from the LED light source to the upper surface of the modular light guide plate to emit evenly, thereby achieving a uniform surface light source. The LED, as a light source, may be a point light source or an elongated surface light source.

The LED in the form of a point light source emits light on one side thereof, and a welding pin is provided on the other side adjacent to or opposite to the side, and the side from which the light is emitted is a plane. Since the side of the light guide plate has a certain length, it is necessary to combine multiple point light source LEDs to form a light source module so that light can be coupled to incident on the entire light incident side wall of the light guide plate. The light source module is composed of a point light source LED and a circuit board. The surface of the circuit board is provided with a pad, and the welding pin of the point light source LED is soldered on the pad of the circuit board. The non-pad area of the circuit board is provided with a light reflection layer, which has a high reflectivity to the light emitted by the LED, so as to prevent light from being absorbed and causing loss.

The circuit board needs to be provided with a positioning and mounting structure, which is usually a positioning screw hole that is used for mounting and fixing the circuit board. The circuit board needs to have the ability to conduct heat and conduct the heat emitted by the LED to prevent the LED temperature from being too high. Multiple LEDs on the light source module are arranged at equal intervals.

The elongated surface light source LED, the light emitting area, and the welding pin are arranged in different areas on the same surface. The elongated surface light source is a LED light source in which a plurality of blue GaN LED chips are packaged in the same light source using a COB (Chip-on-Board) package.

The light emitted by the light source LED is white light. In the CIE1931 color coordinate diagram, the color coordinates corresponding to the white light spectrum are located on the black body locus, and the color temperature is between 1900K and 10000K. White light emitted by the light source LED has a color rendering index Ra greater than 60.

The light guide plate uses an optical polymer resin material having high light transmittance for light emitted from the LED, for example, a polymer resin material such as PMMA, PC, PET, and silicone. The refractive index of these materials are all above 1.4, which is greater than the refractive index of air (refractive index of air=1.0). When light propagates inside the light guide plate, full emission occurs on the inner surface of the light guide plate.

The light emitted by the LED has a certain spatial distribution. The beam angle is usually 120 degrees. Therefore, the light emitted from the LED enters the interior of the light guide plate at different angles from the side wall of the light guide plate. The light having a certain angle with the normal direction of the side wall of the light guide plate will be propagated forward obliquely and reach the upper surface or the lower surface of the light guide plate at a certain incident angle. The light having an incident angle smaller than the critical angle will exit from the surface, and the light having an incident angle larger than the critical angle are totally reflected back inside the light guide plate.

The function of the dots is to destroy the full emission of the local area on the lower surface of the light guide plate, and diffusely reflect the light incident on the lower surface of the light guide plate at the position of the dots to the upper surface of the light guide plate so that this part of the light changes its propagation direction and exits from the upper surface of the light guide plate instead. The dots are arranged in a certain array on the lower surface of the light guide plate. The array is preferably a honeycomb array.

The dot consists of a body material and optical particles. The optical particles are uniformly dispersed inside the body material. The number of optical particles in each dot is more than 100, and the optical particles do not contact each other. The body material is a transparent optical glue before curing and has thixotropy fluidity, so that the dots can be printed on the surface of the light guide plate through a printing process and can be fixed on the surface of the light guide plate to achieve a fixed position, and obtain a three-dimensional shape with a certain height by utilizing the surface tension of the liquid. The cured body material has high adhesion to the light guide plate and the reflective sheet. After the dot is cured, the optical particles are fixedly coated inside the body material. When the number of optical particles in the dots is in the range is from 500 to 2,000, the effects is better, and the effects is the best when the number is 1000.

The optical particles have a high emissivity for the light emitted by the LED. After the light enters the dot, reflection occurs on the surface of the optical particle within the dot, and the direction of propagation is changed; part of the light will be reflected multiple times on the surface of the optical particle within the dot. The light incident on the dot from different angles is reflected back to the light guide plate in an uncertain direction, so that the dot has a diffuse reflection effect on the incident light. If the light that was originally to be fully emitted on the lower surface of the light guide plate is incident on the dot, the full emission will be destroyed.

The light emitted from the non-dot area on the lower surface of the light guide plate will be reflected by the upper surface of the reflective sheet and return to the inside of the light guide plate, or will undergo diffuse reflection after entering the adjacent dot and eventually return to the inside of the light guide plate. The optical waveguide effect is not formed on the lower surface of the light guide plate, thereby avoiding waste of unnecessary light energy.

In a preferred technical solution of the present invention, the optical particles are highly reflective particles, preferably are titanium dioxide particles or barium sulfate particles.

In a preferred technical solution of the present invention, the dot body material is an optically transparent material, preferably epoxy resin or silica gel.

In a preferred technical solution of the present invention, the dot is hemispherical.

The optical particles are highly reflective titanium dioxide particles or barium sulfate particles.

The material of the dot body is epoxy resin or silica gel.

The dot is hemispherical.

The dot is printed on the lower surface of the light guide plate by a screen printing process, the reflective sheet is covered on the dot before the resin of the dot is solidified, and the gap between the upper surface of the reflective sheet and the lower surface of the light guide plate is controlled to be constant, and then the curing of the dot resin is realized by drying, so that both ends of the dot are respectively bonded to the light guide plate and the reflection sheet.

In a preferred technical solution of the present invention, the particle size of the optical particles is less than 300 nm, preferably less than 150 nm, more preferably between 50 and 100 nm.

In a more preferred technical solution of the present invention, the number of optical particles in the dot is 1,000 and the particle size is between 50 and 100 nm.

The optical particles have a particle diameter of less than 100 nm.

The height of the dot is not larger than the diameter of the dot.

In a preferred technical solution of the present invention, the coefficient of thermal expansion of the dot is equal to the coefficient of thermal expansion of the reflective sheet. This design avoids the fact that when the expansion coefficient of the dot and the reflective sheet do not match, the size of the thermal expansion and contraction during use is different, then the reflective sheet will be wrinkled. This is a process improvement.

The coefficient of thermal expansion of the dot is equal to the coefficient of thermal expansion of the reflective sheet.

Preferably, the upper surface of the light guide plate is provided with a raised diffusion dot for achieving uniformity of the light emitted from the upper surface while preventing scratches and fingerprints from being printed. More preferably, the raised diffusion dot is uniformly dispersed with optical particles, wherein said optical particles has the diameter and number in the dot as defined in the above technical solutions.

Preferably, the upper surface of the light guide plate is provided with a concave diffusion dot for achieving uniformity of the light emitted from the upper surface while preventing scratches and fingerprints from being printed. More preferably, the concave diffusion dot is uniformly dispersed with optical particles, wherein said optical particles has the diameter and number in the dot as defined in the above technical solutions.

A modular light guide plate comprising a light guide plate including a side wall used for entering the light to couple the light emitted by the LED into the interior of the light guide plate, an upper surface and a lower surface, and a reflective sheet arranged below the lower surface of the light guide plate and having a high reflectivity to the light emitted by the LED, wherein the lower surface of the light guide plate is provided with a concave dot and the reflective sheet is bonded to the lower surface of the light guide plate.

The dot is realized by a hot press process and the dot is pressed on the lower surface of the light guide plate by rollers before the plate is not completely cured during the process of thermoplastic extrusion molding of light guide plate.

The light guide plate uses an optical polymer resin material having high light transmittance and having thermoplastic property for light emitted from the LED; the molding process includes hot melt, extrusion and cooling steps. After extrusion, the polymer resin material of the light guide plate still has fluidity before being molded from cooling, and is pressed into the lower surface thereof with a mold with evenly distributed bumps. After the mold is formed from cooling, the mold is pulled out, and leaving concave dots on the lower surface of the light guide plate is realized. The surface of the mold bump is chemically etched to form a granular rough texture, so that the surface of the concave dot of the light guide plate has a matte effect and has a diffuse reflection effect on the light.

The upper surface of the reflective sheet is provided with a transparent adhesive layer, and the transparent adhesive layer bonds the upper surface of the reflective sheet and the non-dot area of the lower surface of the light guide plate, thereby realizing the fixed combination of the reflective sheet and the light guide plate.

The present invention further provides a method for producing above modular light guide plate comprising hot-melting, extruding and cooling steps. During the process of the thermoplastic extrusion molding of the light guide plate, before the plate is not completely cured, the concave points are pressed on the lower surface of the light guide plate using the molds with evenly distributed bumps.

The mold with uniformly distributed bumps is preferably a roller.

In a preferred embodiment of the present invention, the surface of the mold bumps can be chemically etched to form a granular rough texture. So that the surface of the concave dot of the light guide plate has a matte effect and has a diffuse reflection effect on the light. The size of rough texture is preferably between 100 um and 300 um.

Compared with the prior art, the present invention has the following beneficial effects: the light of the light guide plate can be effectively reflected back to the upper surface of the light guide plate for incidence, and the entire size of the LED panel light is thinner, and the whole light assembly is more convenient.

The invention will be further described in detail in combination with drawings and the specific embodiments.

DETAILED DESCRIPTION OF PREFERRED EMBODIMENTS

Figure 1:
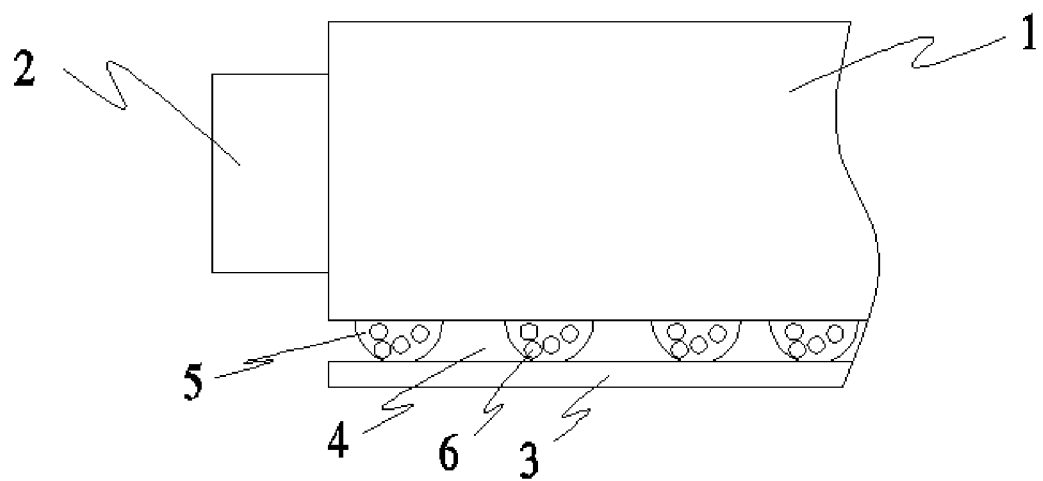
FIG. 1 is a schematic view of Embodiment 1 of the present invention.

FIG. 1 illustrates, according to the embodiments of the present invention, a modular light guide plate comprising a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the dot 5 is uniformly dispersed in the dot 5; there is an air gap 4 between the dots 5. The upper end of the dot 5 is bonded to the lower surface of the light guide plate land the lower end of the dot 5 is bonded to the upper surface of the reflective sheet 3; the material of the dot 5 body is a transparent optical material.

Figure 2:
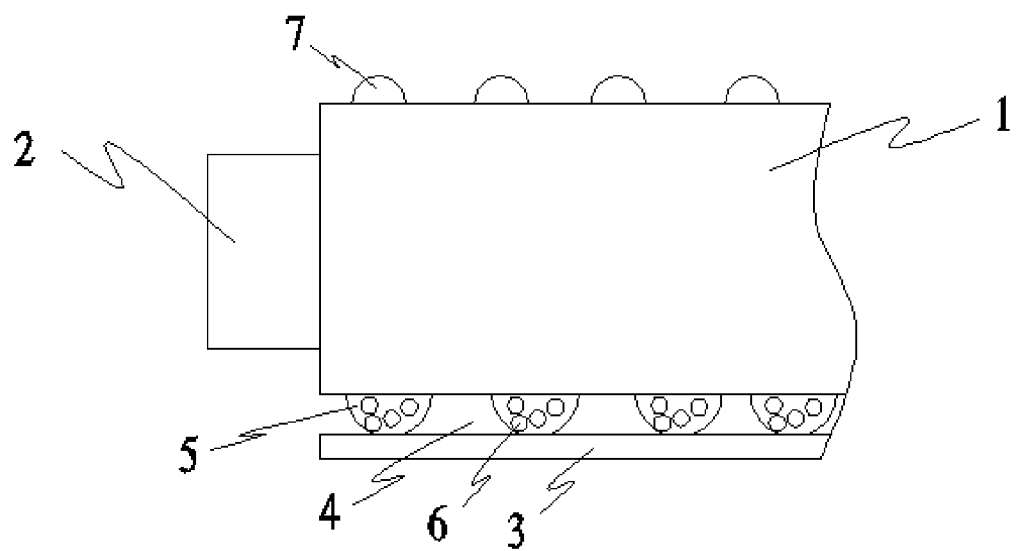
FIG. 2 is a schematic view of Embodiment 2 of the present invention.

FIG. 2 illustrates, according to the embodiments of the present invention, another modular light guide plate comprises a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the upper end of the raised dot 5 is bonded to the lower surface of the light guide plate land the lower end of the raised dot 5 is bonded to the upper surface of the reflective sheet 3; the material of the dot 5 body is a transparent optical material, and optical particles 6 are uniformly dispersed in the dot 5; there is an air gap 4 between the dots 5. Among them, the upper surface of the light guide plate 1 is provided with a raised diffusion dot 7 for achieving uniformity of the light emitted from the upper surface while preventing scratches and fingerprints from being printed.

Figure 3:
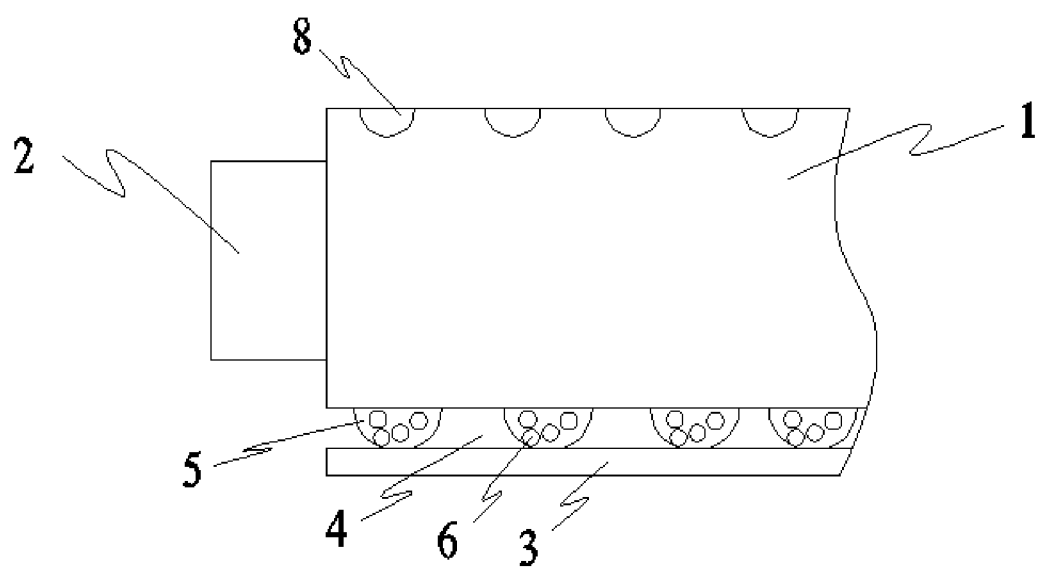
FIG. 3 is a schematic view of Embodiment 3 of the present invention.

FIG. 3 illustrates, according to the embodiments of the present invention, another modular light guide plate comprises a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the upper end of the raised dot 5 is bonded to the lower surface of the light guide plate land the lower end of the raised dot 5 is bonded to the upper surface of the reflective sheet 3; the material of the dot 5 body is a transparent optical material, and optical particles 6 are uniformly dispersed in the dot 5; there is an air gap 4 between the dots 5. The upper surface of the light guide plate 1 is provided with a concave diffusion dot 8 for achieving uniformity of the light emitted from the upper surface while preventing scratches and fingerprints from being printed.

The material of the dot 5 body of the present invention is a transparent optical material, preferably a resin, and even more preferably an acrylic resin or an epoxy resin. In another preferred embodiment, the dot 5 body material is preferably silica gel.

The optical particles 6 of the present invention are highly reflective particles, preferably are titanium dioxide particles or barium sulfate particles.

The dot 5 of the present invention is hemispherical.

The dot 5 of the present invention is printed on the lower surface of the light guide plate 1 by a screen printing process, the reflective sheet 3 is covered on the dot before the resin of the dot 5 is solidified, and the gap between the upper surface of the reflective sheet 3 and the lower surface of the light guide plate 1 is controlled to be constant, and then the curing of the dot 5 resin is realized by drying, so that both ends of the dot 5 are respectively bonded to the light guide plate 1 and the reflection sheet 3.

The particle size of the optical particles of the present invention is less than 300 nm, preferably less than 150 nm, more preferably between 50 and 100 nm.

The height of the dot 5 of the present invention is not larger than the diameter of the dot 5.

The coefficient of thermal expansion of the dot 5 of the present invention is equal to the coefficient of thermal expansion of the reflective sheet 3.

Embodiment 1

With reference to FIG. 1, a modular light guide plate comprises a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the upper end of the raised dot 5 is bonded to the lower surface of the light guide plate land the lower end of the raised dot 5 is bonded to the upper surface of the reflective sheet 3; the material of the dot 5 body is a transparent optical material, and optical particles 6 are uniformly dispersed in the dot 5; there is an air gap 4 between the dots 5.

The optical particles 6 are highly reflective titanium dioxide particles or barium sulfate particles.

The material of the dot 5 body is epoxy resin or silica gel.

The dot 5 is hemispherical.

The dot 5 is printed on the lower surface of the light guide plate 1 by a screen printing process, the reflective sheet 3 is covered on the dot before the resin of the dot 5 is solidified, and the gap between the upper surface of the reflective sheet 3 and the lower surface of the light guide plate 1 is controlled to be constant, and then the curing of the dot 5 resin is realized by drying, so that both ends of the dot 5 are respectively bonded to the light guide plate 1 and the reflection sheet 3.

The optical particles 6 have a particle diameter of less than 150 nm.

The height of the dot 5 is not larger than the diameter of the dot 5.

The coefficient of thermal expansion of the dot 5 is equal to the coefficient of thermal expansion of the reflective sheet 3.

Embodiment 2

With reference to FIG. 2, a modular light guide plate comprises a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the upper end of the raised dot 5 is bonded to the lower surface of the light guide plate land the lower end of the raised dot 5 is bonded to the upper surface of the reflective sheet 3; the material of the dot 5 body is a transparent optical material, and optical particles 6 are uniformly dispersed in the dot 5; there is an air gap 4 between the dots 5.

The optical particles 6 are highly reflective titanium dioxide particles or barium sulfate particles.

The material of the dot 5 body is epoxy resin or silica gel.

The dot 5 is hemispherical.

The dot 5 is printed on the lower surface of the light guide plate 1 by a screen printing process, the reflective sheet 3 is covered on the dot before the resin of the dot 5 is solidified, and the gap between the upper surface of the reflective sheet 3 and the lower surface of the light guide plate 1 is controlled to be constant, and then the curing of the dot 5 resin is realized by drying, so that both ends of the dot 5 are respectively bonded to the light guide plate 1 and the reflection sheet 3.

The optical particles 6 have a particle diameter of less than 100 nm.

The height of the dot 5 is not larger than the diameter of the dot 5.

The coefficient of thermal expansion of the dot 5 is equal to the coefficient of thermal expansion of the reflective sheet 3.

The upper surface of the light guide plate 1 is provided with a raised diffusion dot 7 for achieving uniformity of the light emitted from the upper surface while preventing scratches and fingerprints from being printed.

Embodiment 3

With reference to FIG. 3, a modular light guide plate comprises a light guide plate 1 and a reflective sheet 3; the light guide plate 1 includes a side wall, an upper surface and a lower surface; the side wall of the light guide plate 1 is used for entering the light to couple the light emitted by the LED 2 into the interior of the light guide plate; the reflective sheet 3 is arranged below the lower surface of the light guide plate 1, the upper surface of the reflective sheet 3 has a high reflectivity to the light emitted by the LED 2; the lower surface of the light guide plate 1 is provided with a raised dot 5, wherein the upper end of the raised dot 5 is bonded to the lower surface of the light guide plate 1 and the lower end of the raised dot 5 is bonded to the upper surface of the reflective sheet 3; the material of the dot 5 body is a transparent optical material, and optical particles 6 are uniformly dispersed in the dot 5; there is an air gap 4 between the dots 5.

The optical particles 6 are highly reflective titanium dioxide particles or barium sulfate particles.

The material of the dot 5 body is epoxy resin or silica gel.

The dot 5 is hemispherical.

The dot 5 is printed on the lower surface of the light guide plate 1 by a screen printing process, the reflective sheet 3 is covered on the dot before the resin of the dot 5 is solidified, and the gap between the upper surface of the reflective sheet 3 and the lower surface of the light guide plate 1 is controlled to be constant, and then the curing of the dot 5 resin is realized by drying, so that both ends of the dot 5 are respectively bonded to the light guide plate 1 and the reflection sheet 3.

The optical particles 6 have a particle diameter of less than 50 nm.

The height of the dot 5 is not larger than the diameter of the dot 5.

The coefficient of thermal expansion of the dot 5 is equal to the coefficient of thermal expansion of the reflective sheet 3.

The upper surface of the light guide plate 1 is provided with a concave diffusion dot 8 for achieving uniformity of the light emitted from the upper surface while preventing scratches and fingerprints from being printed.

Embodiment 4 a modular light guide plate comprises a light guide plate including a side wall used for entering the light to couple the light emitted by the LED into the interior of the light guide plate, an upper surface and a lower surface, and a reflective sheet arranged below the lower surface of the light guide plate and having a high reflectivity to the light emitted by the LED, wherein the lower surface of the light guide plate is provided with a concave dot and the reflective sheet is bonded to the lower surface of the light guide plate.

The dot is realized by a hot press process and the dot is pressed on the lower surface of the light guide plate by rollers before the plate is not completely cured during the process of thermoplastic extrusion molding of light guide plate.

The upper surface of the reflective sheet is provided with a transparent adhesive layer, and the transparent adhesive layer bonds the upper surface of the reflective sheet and the non-dot area of the lower surface of the light guide plate, thereby realizing the fixed combination of the reflective sheet and the light guide plate.

The foregoing descriptions are merely preferred embodiments of the present invention, and all equivalent changes and modifications made according to the scope of the present invention for patent application shall fall within the scope of the present invention.

We claim:

1. A modular light guide plate, comprising a light guide plate (1) and a reflective sheet (3); wherein the light guide plate (1) comprises a side wall, an upper surface and a lower surface; wherein the side wall of the light guide plate (1) guides the light emitted by an LED (2) into the interior of the light guide plate; wherein the reflective sheet (3) is arranged below the lower surface of the light guide plate (1); wherein the upper surface of the reflective sheet (3) has a high reflectivity to the light emitted by the LED (2); wherein the lower surface of the light guide plate (1) is provided with a plurality of raised dots (5), wherein the upper end of each raised dot (5) is bonded to the lower surface of the light guide plate and the lower end of each raised dot (5) is bonded to the upper surface of the reflective sheet (3); wherein each raised dot (5) comprises a dot body made of a transparent optical material and optical particles (6) uniformly dispersed in the dot (5); and wherein the raised dots (5) are separated by air gaps (4).

2. The modular light guide plate according to claim 1, wherein the optical particles (6) are highly reflective titanium dioxide particles or barium sulfate particles.

3. The modular light guide plate according to claim 1, wherein the the dot body is made of a resin or a silica gel.

4. The modular light guide plate according to claim 1, wherein the plurality of raised dots (5) are hemispherical in shape.

5. The modular light guide plate according to claim 1, wherein the are plurality of raised dots (5) are printed on the lower surface of the light guide plate (1) by a screen printing process, wherein the reflective sheet (3) is covered on the plurality of raised dots (5) before the material of the dot (5) body is solidified, and the air gaps (4) between the upper surface of the reflective sheet (3) and the lower surface of the light guide plate (1) are controlled to be constant, and wherein the material of the dot (5) body is solidified by drying, so that both ends of each raised dot (5) are respectively bonded to the light guide plate (1) and the reflection sheet (3).

6. The modular light guide plate according to claim 1, wherein the optical particles (6) have a particle diameter of less than 300 nm.

7. The modular light guide plate according to claim 1, wherein the height of the dot (5) is not greater than the diameter of the dot (5).

8. The modular light guide plate according to claim 1, wherein the coefficient of thermal expansion of the dot (5) is equal to the coefficient of thermal expansion of the reflective sheet (3).

9. The modular light guide plate according to claim 1, wherein the upper surface of the light guide plate (1) is provided with a raised diffusion dot (7).

10. The modular light guide plate according to claim 1, wherein the upper surface of the light guide plate (1) is provided with a concave diffusion dot (8).

11. The modular light guide plate according to claim 1, wherein the number of the optical particles (6) in the raised dot (5) or in the diffusion dots (7 or 8) is more than 100.

12. The modular light guide plate according to claim 1, wherein the number of the optical particles (6) in the raised dot (5) or in the diffusion dots (7 or 8) is 1000 and a particle diameter of between 50 to 100 nm.

13. The modular light guide plate according to claim 3, wherein the dot body is made of an acrylic resin or an epoxy resin.

14. The modular light guide plate according to claim 1, wherein the optical particles (6) have a particle diameter of less than 150 nm.

15. The modular light guide plate according to claim 1, wherein the optical particles (6) have a particle diameter of between 50 and 100 nm.

* * * * *